United States Patent [19]

Puzrin et al.

[11] Patent Number: 4,775,091

[45] Date of Patent: Oct. 4, 1988

[54] METHOD OF MANUFACTURING THE ADAPTER OF A MULTIPOLE MAGNETIC SLAB OF A METAL-WORKING MACHINE TOOL

[75] Inventors: Leonid G. Puzrin; Miron G. Atroshenko; Vladimir L. Yaremenko, all of Kiev; Arkady Y. Vernikov; Pavel S. Menaker, both of Odessa; Nikolai F. Bocharov; Nikolai P. Krylov, both of Lipetsk, all of U.S.S.R.

[73] Assignee: Institut Elektrosvarki Imeni E.O. Patona Akademii Nauk Ukrainskoi, Kiev, U.S.S.R.

[21] Appl. No.: 130,538

[22] PCT Filed: Jan. 24, 1986

[86] PCT No.: PCT/SU86/00004

§ 371 Date: Sep. 17, 1987

§ 102(e) Date: Sep. 17, 1987

[87] PCT Pub. No.: WO87/04380

PCT Pub. Date: Jul. 30, 1987

[51] Int. Cl.⁴ .............................................. B23K 37/02

[52] U.S. Cl. ...................................... 228/186; 29/607; 29/423

[58] Field of Search .................. 228/186; 29/602, 607, 29/609, 423

[56] References Cited

U.S. PATENT DOCUMENTS

| | | | |
|---|---|---|---|
| 3,648,357 | 3/1972 | Green | 228/186 |
| 3,783,505 | 1/1974 | Schoen | 29/609 |
| 4,025,379 | 5/1977 | Whetstone . | |

Primary Examiner—M. Jordan
Attorney, Agent, or Firm—Lilling & Greenspan

[57] ABSTRACT

A method of manufacturing the adapter of a multipole slab includes assembling simultaneously a stack of alternating plates of magnetic steel and non-magnetic steel, a solder and a thin-wall steel container of which the walls sealingly enclose the stack of the plates and the solder. Then the container with the stacked plates and solder therein is heated to a soldering temperature, and subsequently cooled. Then the walls of the container adjoining the edges of the stacked plates are removed.

2 Claims, No Drawings

METHOD OF MANUFACTURING THE ADAPTER OF A MULTIPOLE MAGNETIC SLAB OF A METAL-WORKING MACHINE TOOL

TECHNICAL FIELD

The present invention relates to magnetic tooling and, more particularly, to a method of manufacturing the adapter of a multipole magnetic slab of a metal-working machine tool.

PRIOR ART

The magnetic slab as an assembly comprises a power unit accommodated inside a housing covered from above by an adapter of which the face surface is intended for supporting and retaining thereon the workpieces to be worked in the machine.

There is known a method of manufacturing the rectangular adapter of a multipole magnetic plate of a metal-working machine tool, including a rectangular panel of alternating plates made of magnetic steel and brass. The method includes assembling a stack of these plates, making transverse grooves in the surface of the stack, opposite its working surface, and subsequently sealing these grooves with molten brass. The successive stage of the process is securing to the side and end surfaces of the stack strips of magnetic steel and brass, intended for supplying the additional rigidity to the adapter and for attaching the latter to the housing of the magnetic slab (U.S. Pat. No. 2,435,737; Cl. 335-285).

Adapters manufactured in this process would not be sufficiently strong because the securing of the alternating plates together by sealing transverse grooves with molten brass would not provide for their reliable attachment over their entire surface. Local heating accompanying the operation of sealing the grooves with molten brass results in warping of the plates, the gaps thus forming being sealed only partly. Thus, to ensure additional strength, the adapters have to be provided with the said side strips and bars interconnecting these strips, with corresponding openings made through the stack to accommodate these bars. Furthermore, the performance of the known method involves considerable input of effort into the manufacture of the strips and fastening elements, the sealing of the stacks of the plates and subsequent joining of the stack of the plates with the strips.

There is further known a method of manufacturing a laminated adapter of a similar structure, carried out in an oven of a special design, equipped with a device for assembling a stack of alternating plates and compressing it in the course of soldering. The method is performed, as follows: assembling a stack of alternating plates of magnetic steel and brass, interposing leaves of silver solder foil between adjacent magnetic steel and brass plates, then heating the stack thus assembled to a temperature above the melting point of the solder, while pressing the plates to each other, to provide for complete filling with the solder of any gaps between the plates of the magnetic and non-magnetic (brass) materials. Following subsequent cooling, the adapter thus produced is removed from the oven and appropriately machined (U.S. Pat. No. 2,882,458, Cl. 317-163).

The performance of this method involves the necessity of using costly silver solder, to say nothing of its requiring special-design equipment and of the operation of assembling the stack of the plates being carried out under conditions unfavourable for the workers performing it. Moreover, an adapter thus obtained would not be sufficiently strong on account of eventual unsoldered areas, particularly, adjoining its working surface.

DISCLOSURE OF INVENTION

It is an object of the present invention to create a method of producing the adapter of a multipole magnetic slab of a metal-working machine tool, wherein the operation of soldering should be performed under conditions ensuring high strength of the adapter produced with a reduced input of labour and at lower material cost.

This object is attained in a method of manufacturing the adapter of a multipole magnetic slab of a metal-working machine tool, including the steps of assembling a stack of alternating plates of magnetic steel and of a non-magnetic material, and solder, heating the stack thus produced to a temperature sufficient for soldering, and subsequently cooling the stack and machining the surfaces of the adapter thus obtained, in which method, in accordance with the present invention, the plates the non-magnetic materials are plates of stainless steel, the assembling of the alternating plates and solder being conducted simultaneously with the assembling of a thin-wall steel container snugly enclosing the stacked plates from all sides, this container being sealed prior to the heating step, and, after the cooling of this container with the stacked plates and solder therein, the walls of the container adjoining the edges of the plates being removed.

The disclosed method allows to produce an adapter of a higher strength than adapters of the prior art, and that with a reduced input of labour and at lower material cost.

In accordance with the present invention, it is expedient that the solder used should be in the form of a metal sheet corresponding to the working surface of the adapter, positioned at the exposed ends of the plates in the stack.

In this way the soldering operation becomes the most complete, and the strength of the adapter is additionally enhanced.

PREFERRED EMBODIMENT OF THE INVENTION

The method of manufacturing the adapter of a multipole magnetic slab of a metal-working machine tool in accordance with the invention provides for producing adapters made of alternating plates of: (1) magnetic steel, e.g. low carbon steel, and (2) stainless steel which, as it is known, is a non-magnetic material.

According to the present invention, we propose to assemble in a single operation:

(a) a stack of alternating plates of the abovementioned materials and solder, preferably in the form of a metal sheet. The solder is positioned on the assembled stack of the plates of the magnetic and non-magnenic materials so that it should cover the ends of the plates forming the stack. It is further expedient that the solder should cover the longest exposed ends of the plates. As the metal solder in accordance with the invention, either copper or copper-base alloys may be used.

Generally, the thickness of the plates of the magnetic steel is about 3–5 mm, and the thickness of the plates of the non-magnetic material is 1–2 mm.

Some 200 alternating plates are assembled into the stack; however, the actual number of these alternating plates of magnetic and non-magnetic materials may vary within a broad range depending in each specific case on the required working area and other characteristics of the adapter to be produced;

(b) a thin-wall steel container snugly enclosing from all sides the stack of the plates and solder.

The operation of assembling simultaneously the steel container, the solder and the stack of the plates is preferably performed, as follows. The stack of the plates is assembled on the bottom of the would-be container, with the ends of the stacked plates, preferably the longest ones, contacting the bottom of this would-be container.

Then one of the side walls of the container is sealingly welded to the bottom at 90° to it, the stack of the alternating plates of stainless and low-carbon steel being firmly pressed against this wall by the endmost plate. Then the other side wall of the container is firmly pressed against the other endmost plate of the stack, so that the stack is thus pressed against the first side wall, and the other side wall is sealingly welded to the bottom of the container in this position. Then two end walls of the container are sealingly welded to the bottom of the container and to the side walls at 90° to them. The exposed top of the stack is covered by a sheet of solder, and then the lid of the container is sealingly welded to its four walls.

The invention also provides for producing an adapter not with the longitudinal arrangement of the plates, as described above, but with transversely arranged plates. This is done by, first, welding one of the end walls to the bottom of the container, and then stacking the plates transversely (relative to the bottom of the container) on this bottom, and pressing them together with the other end wall. Alternatively, the container itself can be made not of the six abovementioned parts, but of a single blank of an appropriate shape, its corresponding portions being successively bent and welded in the course of the assembling operation.

The container thus produced is sealed and heated to a soldering temperature in a common-type oven or furnace.

In the course of the heating, any remaining small gaps and spaces inside the container are evacuated owing to the atmospheric gases dissolving in the material of the plates and of the walls of the container. Owing to the vacuum thus produced, the surfaces of the plates to be soldered become relieved of any remaining scale or non-metallic inclusions, which promotes their strong joining with the molten solder filling practically all gaps between the plates. This filling of any remaining gap with the solder material is further promoted owing to the atmospheric pressure inside the oven compressing the container, so that its relatively soft lid urges the solder into gaps between the plates.

The effect of the self-cleaning of the surfaces to be soldered together is significantly enhanced by the use in the adapter of non-magnetic plates of stainless steel which actively absorb atmospheric gases when heated to elevated temperatures.

Then the container is cooled, whereafter its lid, bottom and side walls are removed, e.g. by machining, and the thus produced adapter is apropriately finished.

An adapter thus produced is highly strong owing to the plates of the magnetic and non-magnetic materials being reliably soldered together due to all the advantages offered by soldering in vacuum. Adapters manufactured in the disclosed process are relatively inexpensive owing to the simplicity of the process requiring no special-design equipment and using relatively inexpensive high-temperature solders.

INDUSTRIAL APPLICABILITY

The invention will be employed in machine-tool engineering, in the manufacture of machine tools where workpieces, particularly smally parts and blanks of ferromagnetic materials, are retained for various machining operations on a magnetic slab.

We claim:

1. A method of manufacturing the adapter of a multipole magnetic slab of a metal-working machine tool, comprising the steps of assembling a stack of alternating plates made of magnetic steel and of a non-magnetic material, and solder, heating the stack thus produced to a temperature sufficient for soldering, and subsequently cooling the stack and machining the surfaces of the adapter thus obtained, characterized in that the plates of the non-magnetic material are plates of stainless steel, the assembling of the alternating plates and solder being conducted simultaneously with the assembling of a thin-wall steel container snugly enclosing the stacked plates from all sides, this container being sealed prior to the heating step, and the walls of the container adjoining the edges of the plates being removed after the cooling of the container with the stacked plates and solder therein.

2. A method according to claim 1, characterized in that the solder used is in the form of a metal sheet corresponding to the working surface of the adapter, positioned at the exposed ends of the plates in the stack.

* * * * *